J. J. LANDSBERGER.
BINDER TWINE CURING MACHINE.
APPLICATION FILED MAY 9, 1913.
1,096,845.
Patented May 19, 1914.
2 SHEETS—SHEET 1.
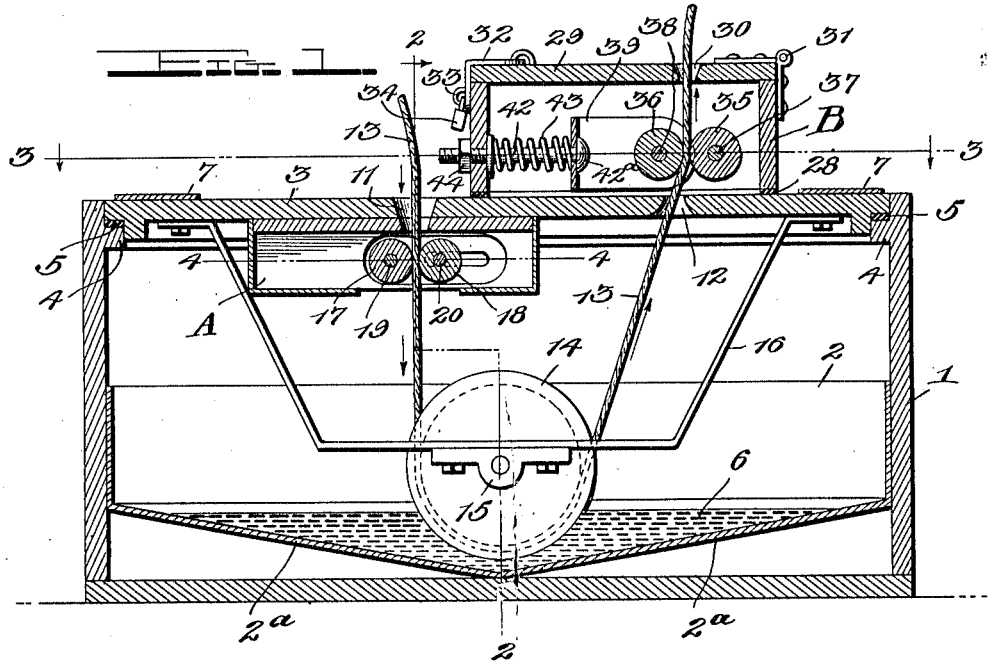
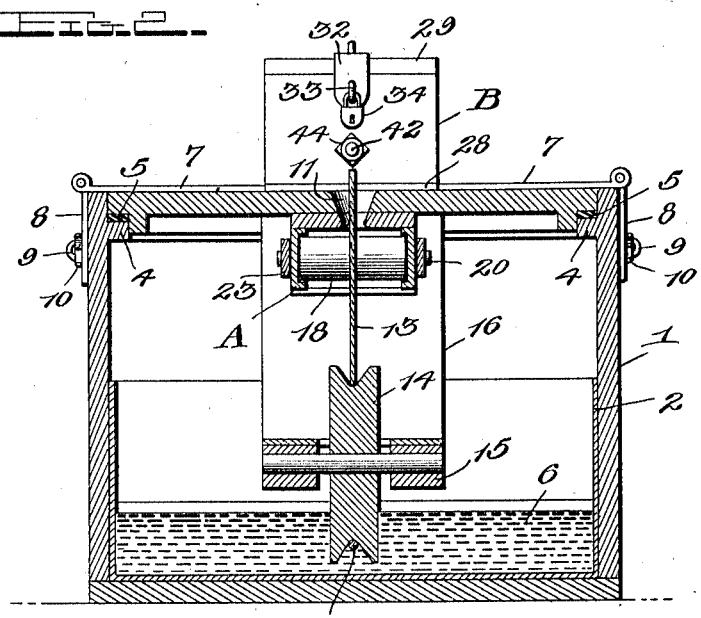
Witnesses
Chas. L. Griesbauer
Harriet B. Cornwall
Inventor
John J. Landsberger,
By J. H. A. Hire
Attorney

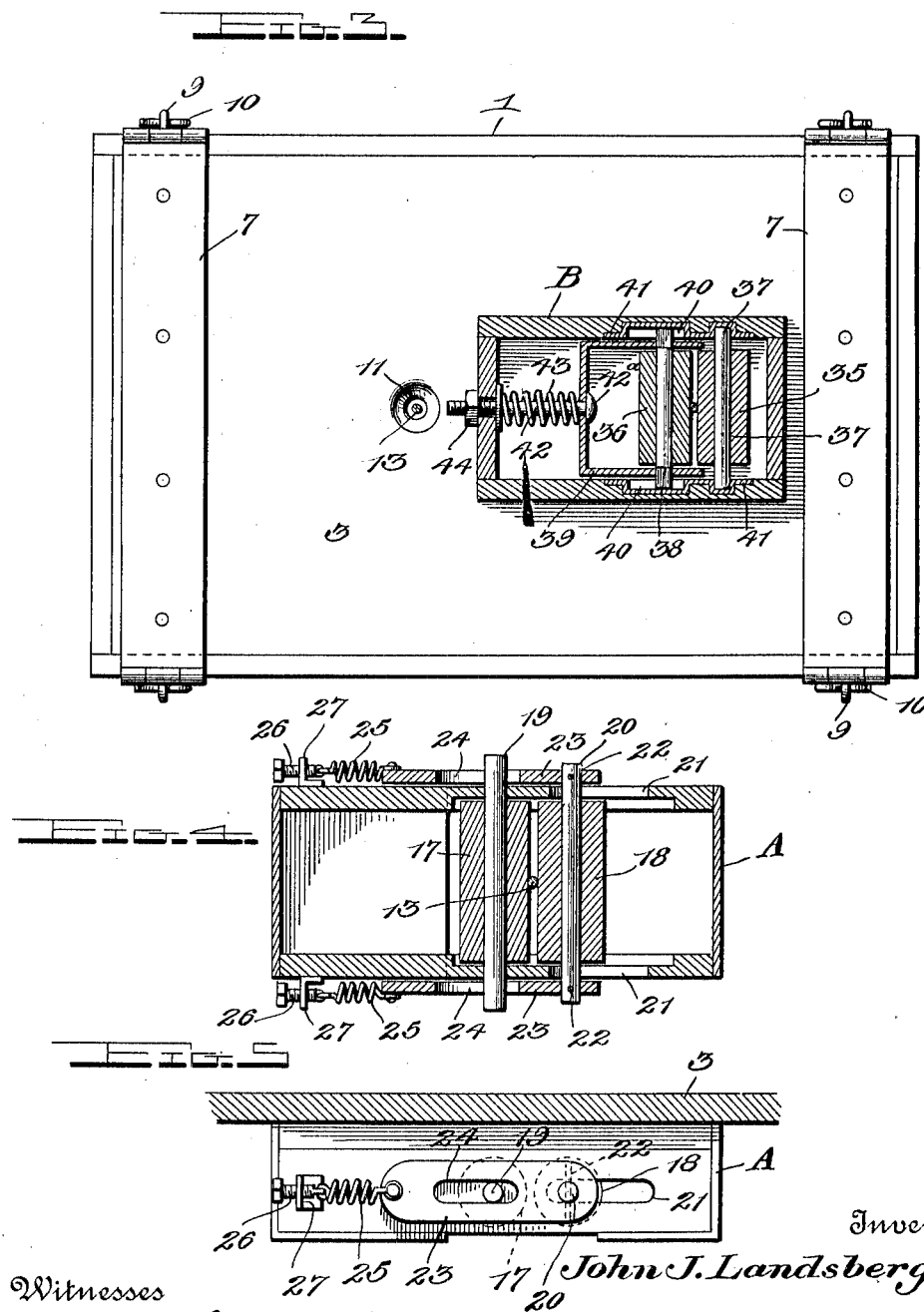

UNITED STATES PATENT OFFICE.

JOHN J. LANDSBERGER, OF DOUGLAS, MINNESOTA.

BINDER-TWINE-CURING MACHINE.

1,096,845.  Specification of Letters Patent.  Patented May 19, 1914.

Application filed May 9, 1913. Serial No. 766,646.

*To all whom it may concern:*

Be it known that I, JOHN J. LANDSBERGER, citizen of the United States, residing at the town of Douglas, in the county of Dakota and State of Minnesota, have invented certain new and useful Improvements in Binder-Twine-Curing Machines, of which the following is a specification.

The present invention relates to an improved machine for treating twine and the like with a preservative fluid, the object of the invention being to provide a device of this character which embodies novel features of construction whereby it may be readily mounted upon a binder or the like so as to treat the twine as it passes to the binder and at the same time maintain the twine under the proper tension for the effective operation of the binder.

A further object of the invention is to provide a twine curing machine which is comparatively simple and inexpensive in its construction, which is economical in the use of the preservative fluid, which has a compact arrangement of the parts, and which serves to produce the necessary tension in the twine and to remove all superfluous quantities of the preservative fluid from the twine before it finally emerges from the machine.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a longitudinal sectional view through a twine curing machine constructed in accordance with the invention. Fig. 2 is a transverse sectional view on the line 2—2 of Fig. 1. Fig. 3 is a horizontal sectional view on the line 3—3 of Fig. 1. Fig. 4 is a similar view on the line 4—4 of Fig. 1, and Fig. 5 is a side elevation of the tension box which is applied to the inside of the cover and acts upon the twine as it enters the tank.

Corresponding and like parts are referred to in the following description and indicated in all the views of the drawings by the same reference characters.

Specifically describing the present embodiment of the invention, the numeral 1 designates the casing within which the tank 2 is mounted, the said casing being of any suitable size and shape and being normally closed by means of a cover 3. The mouth of the casing 1 is shown as provided with an inwardly projecting flange 4 upon which the edge of the cover 3 rests, a suitable packing member 5 being interposed between the edge of the cover and the flange so as to produce a tight joint and prevent the preservative fluid 6 within the tank from splashing out of the device. Any suitable means may be provided for retaining the cover 3 in position upon the casing, although in the present instance a pair of transverse securing strips 7 are shown as applied to opposite ends of the cover, the extremities of the securing strips 7 having the hasp members 8 hinged thereto for engagement with staples or like members 9 which project from the sides of the casing 1. Cotter-pins 10 or similar fastening members may be employed for normally retaining the hasps 8 in engagement with the staples 9, and it will be obvious that by removing those cotter-pins 10 upon one side of the casing 1, the cover 3 will be released at one edge thereof so that it can be readily swung upwardly about the hasp members 8 at the opposite edge thereof as a pivot. Access may thus be readily had to the interior of the casing 1 and tank 2 without the necessity of entirely removing the cover 3 from the casing, although the cover may be completely detached from the casing at any time should this be found desirable.

A pair of guide openings 11 and 12 are formed in the cover 3, the twine 13 entering the casing through the guide opening 11 and leaving the casing through the guide opening 12 after having passed around the grooved wheel 14 and been immersed thereby in the preservative fluid 6. This immersing wheel 14 is journaled within suitable bearings 15 upon a U-shaped bracket 16 the arms of which have the extremities thereof secured to the lower face of the cover 3, while the lower transverse end portion of the bracket is substantially horizontally disposed and is slotted to receive the immersing wheel 14. The grooved immersing wheel 14 projects downwardly into the tank 2 to within a short distance of the bottom thereof, and the bottom of the tank is inclined downwardly from opposite ends thereof toward the immersing wheel, as indicated at 2ª, so that the preservative fluid within the tank will be deflected toward the immersing wheel and caused to operate effectively upon the twine even where there is but a small amount of the fluid within the tank.

After entering the casing 1 through the opening 11 of the cover 3, the twine passes through a tension box A which is secured to the inner face of the cover 3, the said tension box serving both to produce the necessary tension in the twine and also to prevent the preservative fluid from splashing out through the guide opening 11. Mounted within the tension box A are the rollers 17 and 18, the roller 17 being mounted upon a shaft 19 and being fixed, while the roller 18 is mounted upon a shaft 20 and is movable toward and away from the fixed roller 17. The ends of the shaft 20 are slidably mounted within suitable guide slots formed in the sides of the tension box A, the extremities of the shaft projecting beyond the sides of the tension box and being secured in any suitable manner as by means of the pins 22 to slides 23. These slides 23 are provided with the longitudinal slots 24 which loosely receive the projecting ends of the shaft 19 upon which the fixed roller 17 is mounted, the ends of the slides 23 being engaged by tension springs 25 which normally tend to draw the movable roller 18 toward the fixed roller 17 so as to cause the two rollers to securely grip the twine 13 which passes between the same. The extremities of the shaft 19 coöperate with the slots 24 of the slides 23 to aid in the support of the slides and also to direct the slides in their longitudinal back and forth movement, while the slots 21 in the sides of the tension box A serve as guides for the ends of the shaft 20 upon which the movable roller 18 is mounted. The tension in the springs 25 may be adjusted as may be found necessary for the purpose of regulating the tension produced in the twine 13, and for this purpose the ends of the springs 25 are shown as secured to adjusting screws 26 which are threaded within brackets 27 projecting from the sides of the tension box A.

As the twine 13 emerges from the casing 1 through the guide opening 12 in the cover thereof, it passes through the second tension box B which is secured to the top of the cover, a suitable packing member 28 being shown as interposed between the bottom of the tension box B and the top of the cover 3 so as to produce a tight joint therewith and cause the preservative fluid to be retained within the box B until it may flow back into the tank 2 through the guide opening 12. The cover 29 of the tension box B is provided with an outlet opening 30 for the twine and is hinged to the box as indicated at 31 so that it can be readily swung upwardly for the purpose of enabling access to be obtained to the tension rollers on the interior of the box. The swinging end of the cover 29 is shown as provided with a hasp member 32 which engages a staple or like member 33 at the end of the box B, a padlock 34 or other suitable member being adapted to be applied to the staple for the purpose of locking the cover in a closed position. The twine 13 as it passes through the tension box B is engaged by a fixed tension roller 35 and also by a movable tension roller 36, the two rollers acting as a wringer to remove the surplus amount of the preservative fluid from the twine, and also coöperating with the tension rollers of the box A to produce the necessary tension in the twine. The fixed roller 35 is mounted upon a shaft 37, while the movable roller 36 is mounted upon a shaft 38, the ends of the shaft 38 being engaged by a yoke 39, while the extremities of the shaft are loosely received within suitable guide slots 40 which are shown in the present instance as formed in plates 41 embedded in the sides of the box B, the said plates being also shown as provided with depressions to receive the ends of the shaft 37. The cross bar of the yoke 39 is slidably mounted upon a guide bolt 42 which projects inwardly from one end of the tension box B, a coil spring 43 which surrounds the bolt being interposed between the yoke and the box B so as to normally tend to move the cross bar of the yoke 39 outwardly toward the head 42ª of the bolt 42. The movable roller 36 is thus held by the spring 43 in a yielding engagement with the twine so as to compress the twine against the fixed roller 25 and thereby remove any surplus amount of the preservative fluid from the twine. The end of the bolt 42 passes through the end of the box B and has a nut 44 applied thereto, the tension in the spring 43 being adjustable by tightening or loosening the nut 44 as may be found necessary.

In the operation of the device the casing 1 may be mounted upon a binder or other machine in any suitable manner so that the twine may be caused to pass through the casing and be treated by the preservative fluid within the tank 2 before being fed to the machine. The rollers within the tension boxes can be readily adjusted to obtain the necessary tension in the twine, and twine thus treated with a preservative fluid will be immune from the attacks of grasshoppers, crickets, and other insects, as well as from the ravages of mice and rodents. Where the twine curing device is used in connection with a binder, the bundles of grain will remain intact and the loss usually occasioned through the gnawing of the twine by insects and mice and the consequent breakage thereof thereby avoided. The use of the twine curing machine is not restricted to binders, however, since it may be employed in connection with any machine using twine, or merely for the purpose of treating twine for various farm and domestic uses.

Having thus described the invention, what I claim as new and desire to secure by Letters Patent, is:—

1. A portable machine for treating twine as it is fed to a binder or the like, including a closed casing having a tank therein, a removable cover for the casing, said cover having guide openings therein through which the twine enters and leaves the casing, means for producing a tight joint between the cover and the casing, a bracket carried by the cover and projecting into the tank, an immersing wheel mounted upon the bracket, the twine being adapted to pass around the immersing wheel and be carried thereby into the tank, and tension means for acting upon the twine.

2. A machine for treating twine including a casing having a tank therein, a cover for the casing, said cover being provided with guide openings through which the twine enters and leaves the casing, a bracket carried by the cover and projecting into the casing, an immersing wheel mounted upon the bracket, the twine being adapted to pass around the immersing wheel and be carried thereby into the tank, and tension means mounted upon the cover for engaging the twine both as it enters and leaves the casing.

3. A machine for treating twine and the like including a casing having a tank therein, a removable cover for the casing, said cover being provided with guide openings through which the twine enters and leaves the casing, a bracket carried by the cover and projecting into the casing, an immersing wheel mounted upon the bracket, the twine passing around the immersing wheel and being carried thereby into the tank, tension boxes mounted upon the cover and extending across the guide openings thereof, and tension means within the tension boxes for acting upon the twine as it enters and leaves the casing.

4. A machine for treating twine and the like including a casing having a tank therein, a removable cover for the casing, said cover being provided with guide openings through which the twine enters and leaves the casing, a bracket carried by the cover and projecting downwardly into the casing, an immersing wheel mounted upon the bracket, the twine being adapted to pass around the immersing wheel and be carried thereby into the tank, tension boxes mounted upon the cover and extending across the guide openings thereof, and a pair of coöperating tension rollers mounted within each of the tension boxes, the said tension rollers acting upon the twine as it enters and leaves the casing.

5. A machine for treating twine including a casing having a tank therein, a cover for the casing, the said cover being provided with guide openings through which the twine enters and leaves the casing, a bracket carried by the cover and projecting into the casing, an immersing wheel mounted upon the bracket, the twine being adapted to pass around the immersing wheel and be carried thereby into the tank, a tension box mounted upon the cover over one of the guide openings, a fixed tension roller within the box, a shaft upon which the fixed tension roller is mounted, the ends of the shaft projecting beyond the sides of the box, a movable tension roller, a shaft upon which the movable tension roller is mounted, slides connected to the shaft of the movable tension roller and having a sliding engagement with the projecting ends of the shaft of the fixed roller, springs connected to the slides, and coöperating tension means mounted upon the cover adjacent the other guide opening thereof.

6. A machine for treating twine and the like including a casing having a tank therein, a removable cover for the casing, said cover being provided with guide openings through which the twine enters and leaves the casing, a bracket carried by the cover and projecting into the casing, an immersing wheel mounted upon the bracket, the twine being adapted to pass around the immersing wheel and be carried thereby into the tank, a tension box mounted upon the cover over one of the guide openings, said tension box having corresponding slots in opposite sides thereof, a fixed tension roller within the box, a shaft upon which the fixed tension roller is mounted, the ends of the shaft projecting beyond opposite sides of the box, a movable tension roller, a shaft upon which the movable tension roller is mounted, the ends of the said shaft being loosely received within the before mentioned slots in the sides of the box, slides connected to the ends of the said shaft and provided with guide slots loosely receiving the projecting ends of the shaft of the fixed tension roller, springs connected to the slides, and coöperating tension means mounted upon the cover adjacent the opposite guide opening thereof.

7. A machine for treating twine and the like including a casing having a tank therein, a removable cover for the casing, said cover being provided with guide openings through which the twine enters and leaves the casing, a bracket carried by the cover and projecting into the casing, an immersing wheel mounted upon the bracket, the twine being adapted to pass around the immersing wheel and be carried thereby into the tank, tension means mounted upon the cover adjacent the guide openings through which the twine enters the casing, a tension box mounted upon the top of the cover and surrounding the guide opening through which the twine leaves the casing, packing means between the lower edge of the tension box and the cover to provide a tight joint between the said members, and tension producing means within the said tension box.

8. A machine for treating twine and the like including a casing having a tank therein, a removable cover for the casing, said cover being provided with guide openings through which the twine enters and leaves the casing, a bracket carried by the cover and projecting into the casing, an immersing wheel mounted upon the bracket, the twine being adapted to pass around the immersing wheel and be carried thereby into the tank, tension means mounted upon the cover adjacent the guide opening through which the twine enters the tank, a tension box mounted upon the cover adjacent the opposite guide opening, a fixed tension roller within the tension box, a movable tension roller for coöperation with the fixed tension roller, a yoke carrying the movable tension roller, guide means for the yoke and roller, and a spring engaging the yoke for normally holding the movable tension roller in operative position.

9. A machine for treating twine including a casing having a tank therein, a removable cover for the casing, said cover being provided with guide openings through which the twine enters and leaves the casing, a bracket carried by the cover and projecting into the casing, an immersing roller mounted upon the bracket, the twine being adapted to pass around the immersing roller and be carried thereby into the tank, tension means mounted upon the cover adjacent the guide opening through which the twine enters the casing, a tension box mounted upon the cover adjacent the opposite guide opening, a fixed tension roller within the tension box, a movable tension roller, a shaft upon which the movable tension roller is mounted, guide means upon the sides of the tension box for engaging the shaft, a yoke connected to the shaft, guide means for the yoke, and a spring engaging the yoke for normally holding the movable tension roller in operative position.

10. A machine for treating twine including a casing having a tank therein, a removable cover for the casing, said cover being provided with guide openings through which the twine enters and leaves the casing, a bracket carried by the cover and projecting into the casing, an immersing roller mounted upon the bracket, the twine being adapted to pass around the immersing roller and be carried thereby into the tank, a tension box mounted upon the inner face of the cover adjacent the guide opening through which the twine enters the casing, a fixed roller within the said tension box, a shaft upon which the fixed roller is mounted, the ends of the shaft projecting upon opposite sides of the box, a movable tension roller, a shaft for the movable tension roller, slides connected to the said shaft and having a sliding engagement with the projecting ends of the shaft of the fixed roller, springs engaging the slides, a second tension box mounted upon the top of the cover adjacent the other guide opening thereof, a fixed roller within the second tension box, a movable roller within the second tension box, a shaft upon which the movable roller is mounted, guide means upon the sides of the tension box for engaging the shaft, a yoke engaging the shaft, guide means for the yoke, and a spring engaging the yoke for normally holding the movable roller in operative position.

In testimony whereof I affix my signature in presence of two witnesses.

JOHN J. LANDSBERGER.

Witnesses:
A. W. HANSON,
H. H. CREMER.

---

Copies of this patent may be obtained for five cents each, by addressing the "Commissioner of Patents, Washington, D. C."